(12) United States Patent
Zhao

(10) Patent No.: US 9,842,258 B2
(45) Date of Patent: Dec. 12, 2017

(54) SYSTEM AND METHOD FOR VIDEO PREVIEW

(71) Applicant: Xiaoyi Technology Co., Ltd., Shanghai (CN)

(72) Inventor: Lili Zhao, Shanghai (CN)

(73) Assignee: XIAOYI TECHNOLOGY CO., LTD., Shanghai (CN)

(*) Notice: Subject to any disclaimer, the term of this patent is extended or adjusted under 35 U.S.C. 154(b) by 49 days.

(21) Appl. No.: 15/140,982

(22) Filed: Apr. 28, 2016

(65) Prior Publication Data

US 2017/0262707 A1    Sep. 14, 2017

(30) Foreign Application Priority Data

Mar. 8, 2016  (CN) .......................... 2016 1 0130699

(51) Int. Cl.
*H04N 21/472*  (2011.01)
*G06K 9/00*  (2006.01)
*G11B 27/031*  (2006.01)

(52) U.S. Cl.
CPC ........ *G06K 9/00751* (2013.01); *G11B 27/031* (2013.01); *G06K 2009/00738* (2013.01)

(58) Field of Classification Search
CPC ................. G06K 9/00; G06K 9/00751; G06K 2009/00738; G11B 27/00; G11B 27/031; H04N 7/18; H04N 5/232
See application file for complete search history.

(56) References Cited

U.S. PATENT DOCUMENTS

2016/0247257 A1*  8/2016  Cheung .................... G06T 5/50
2016/0381276 A1*  12/2016  Li ...................... H04N 5/23206
                                                                  348/211.3

* cited by examiner

*Primary Examiner* — Huy T Nguyen
(74) *Attorney, Agent, or Firm* — Finnegan, Henderson, Farabow, Garrett & Dunner, L.L.P.

(57) ABSTRACT

A method for presenting a preview of a video includes receiving a first version of the video. The first version of the video has a first resolution. The method also includes analyzing the first version of the video and identifying a first preview frame from the first version of the video based on the analysis of the first version of the video. The method further includes obtaining information relating to the identified first preview frame and receiving a second version of the video. The second version of the video has a second resolution, which is greater than the first resolution. The method also includes extracting, from the second version of the video, a second preview frame according to the information relating to the first preview frame.

20 Claims, 7 Drawing Sheets

SYSTEM AND METHOD FOR VIDEO PREVIEW

CROSS-REFERENCE TO RELATED APPLICATION

This application is based upon and claims priority to Chinese Patent Application No. 201610130699.2, filed Mar. 8, 2016, the entire contents of which are incorporated herein by reference.

TECHNICAL FIELD

The present disclosure generally relates to previewing a video, and more specifically relates to systems and methods for generating video preview frames of a video.

BACKGROUND

Video monitoring devices allow individuals and businesses to monitor premises for various purposes, including, for example, security, baby or elderly monitoring, videoconference, etc. Such video monitoring devices may record videos continuously, generating a huge amount of video data every day. Reviewing video data, however, may be challenging. For example, a user may not have enough time to review a video in its entirety.

Such inconvenience may be partially resolved by displaying some video preview frames extracted from the video so that a user can review the video preview frames instead of the whole video. For example, a video preview frame may be selected from the video every certain period of time. Although this may be easy to implement, there are shortcomings. The extracted video preview frames may not catch all special events (e.g., a baby crying). Thus, a user who only reviews these video preview frames may miss some special events. In addition, the video preview frames presented to the user may look the same, and the user may still miss a special event included in the video preview frames if there is no indication that the special event occurred.

SUMMARY

One aspect of the present disclosure is directed to a device for generating preview frames of a video. The device includes a memory configured to store instructions and one or more processors configured to execute the instructions to receive a first version of the video. The first version of the video has a first resolution. The one or more processors are also configured to execute the instructions to analyze the first version of the video and identify a first preview frame from the first version of the video based on the analysis of the first version of the video. The one or more processors are further configured to execute the instructions to obtain information relating to the identified first preview frame and receive a second version of the video. The second version of the video has a second resolution, which is greater than the first resolution. The one or more processors are also configured to execute the instructions to extract, from the second version of the video, a second preview frame according to the information relating to the first preview frame.

Another aspect of the present disclosure is directed to a method for generating video preview frames for a video. The method includes receiving a first version of the video. The first version of the video has a first resolution. The method also includes analyzing the first version of the video and identifying a first preview frame from the first version of the video based on the analysis of the first version of the video. The method further includes obtaining information relating to the identified first preview frame and receiving a second version of the video. The second version of the video has a second resolution, which is greater than the first resolution. The method also includes extracting, from the second version of the video, a second preview frame according to the information relating to the first preview frame.

Yet another aspect of the present disclosure is directed to a non-transitory computer readable medium embodying a computer program product, the computer program product comprising instructions configured to cause a computing device to receive a first version of the video. The first version of the video has a first resolution. The instructions further cause the computing device to analyze the first version of the video and identify a first preview frame from the first version of the video based on the analysis of the first version of the video. The instructions further cause the computing device to obtain information relating to the identified first preview frame and receive a second version of the video. The second version of the video has a second resolution, which is greater than the first resolution. The instructions further cause the computing device to extract, from the second version of the video, a second preview frame according to the information relating to the first preview frame.

DESCRIPTION OF DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
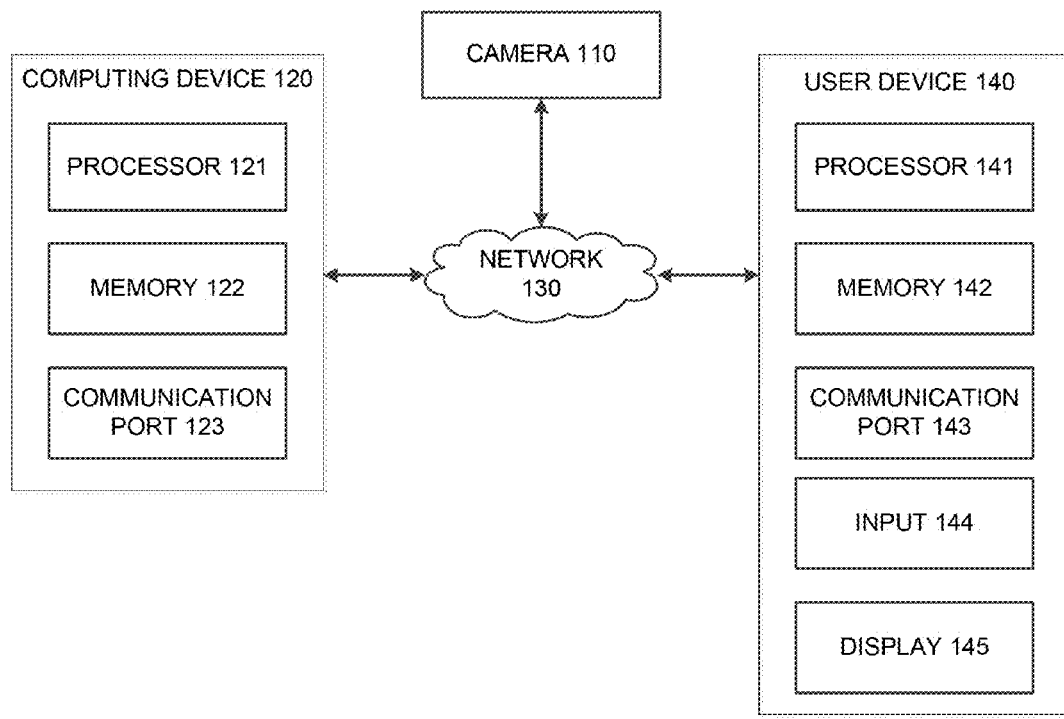
FIG. 1 is a block diagram of an exemplary system for previewing a video according to some embodiments.

The disclosure is directed to systems and methods for presenting a preview video and/or video preview frames to a user. For example, FIG. 1 illustrates a system 100 including a camera 110, a computing device 120, a network 130, and a user device 140. Camera 110 is a device configured to capture a video. For example, camera 110 may be a digital camera, a web camera, a smartphone, a tablet, a laptop, a video gaming console equipped with a web camera, etc. In some embodiments, camera 110 may further be configured to capture a video with a native resolution of 320×240, 426×240, 640×360, 480×360, 800×600, 852×640, 960×540, 1024×768, 1280×720, 1280×960, 1280×1024, 1440×1050, 1440×1080, 1600×1200, 1920×1080, 2560×1440, 3840×2160, 5120×2880, 7680×4320, or any other suitable resolutions. It will be understood that the forgoing examples are representative of exemplary embodiments only. The disclosed systems and methods may be implemented to provide enhanced resolution that is greater than the native or standard resolution capability.

In some embodiments, camera 110 is also configured to transmit the video (or different versions thereof) to computing device 120 and/or user device 140 via network 130. Alternatively or additionally, camera 110 may be configured to transmit a stream video to computing device 120 and/or user device 140 in real time.

In some embodiments, camera 110 and computing device 120 may be packaged in a single device configured to perform functions of camera 110 and computing device 120 described in this disclosure. In some embodiments, camera 110 may also include one or more processors and memory configured to perform one or more processes described in this disclosure. For example, camera 110 may be configured to generate preview videos and/or video preview frames, and transmit the sample videos and/or video preview frames to user device 140, as described elsewhere in this disclosure.

In some embodiments, camera 110 transmits a first version of a video with a first resolution and a second version of the same video with a second resolution to computing device 120 and/or user device 140. Merely by way of example, camera 110 captures a video in a native resolution of 3840×2160. Camera 110 may also convert the captured video to a version with a lower resolution of, for example, 426×240. Camera 110 further transmits a first version of the captured video with the resolution of 426×240 and a second version of the captured video with the resolution of 3840×2160 to computing device 120 for further processing. Alternatively, camera 110 transmits the video in the native resolution (e.g., 3840×2160) to computing device 120, which may then convert the video into a version with a lower resolution (e.g., 426×240).

Computing device 120 is configured to process one or more versions of the video (e.g., a first and/or a second version of a video) received from camera 110 and/or converted by computing device 120. For example, computing device 120 is configured to analyze the first version of the video with a first resolution (e.g., 426×240). Computing device 120 is also configured to obtain information relating to one or more preview frames to be extracted based on the analysis of the first version of the video. Computing device 120 then extracts, from a second version of the video with a higher resolution (e.g., 3840×2160), one or more video frames as preview frame(s) according to the obtained information. In such a manner, computing requirement for processing the video with the higher resolution can be reduced, while the quality of the preview frames is not sacrificed.

In some embodiments, computing device 120 is further configured to generate a preview video for the video received from the camera based on the extracted preview frames. The preview video and/or preview frames are also transmitted to user device 140.

Computing device 120 is a web camera, digital camera, a computer server, a desktop computer, a notebook computer, a tablet computer, a mobile phone, a personal digital assistant (PDA), or the like. Computing device 120 includes, among other things, a processor 121, memory 122, and communication port 123. In operation, processor 121 executes computer instructions (program code) and performs functions in accordance with techniques described herein. Computer instructions include routines, programs, objects, components, data structures, procedures, modules, and functions, which perform particular functions described herein. For example, processor 121 receives and analyzes a first version of the video captured by camera 110. Processor 121 obtains information of one or more preview frames to be extracted from a second version of the video based on the analysis of the first version of the video. Processor 121 further extracts from the second version of the video one or more video frames based on the obtained information. Processor 121 includes or is part of one or more known processing devices such as, for example, a microprocessor. In some embodiments, processor 121 includes any type of single or multi-core processor, mobile device microcontroller, central processing unit, etc.

Memory 122 is configured to store one or more computer programs to be executed by processor 121 to perform exemplary methods disclosed herein. For example, memory 122 is configured to store program(s) executed by processor 121 to extract image frames from the second version of the video received from camera 110. Memory 122 is also configured to store data and/or parameters used by processor 121 in methods described in this disclosure. For example, memory 122 stores one or more sound models for detecting an event included in a video. Processor 121 can access the sound model(s) stored in memory 122, and detect one or more events based on a sound signal included in the video and the accessed sound model(s) as described elsewhere in this disclosure. In some embodiments, memory 122 is configured to store one or more versions of the video received from camera 110.

Memory 122 is a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 123 is configured to transmit data to and receive data from, among other devices, camera 110 and user device 140 over network 130. Network 130 is any type of wired or wireless network that allows transmitting and receiving data. For example, network 130 is a wired network, a local wireless network, (e.g., Bluetooth™, WiFi, near field communications (NFC), etc.), a cellular network, the Internet, or the like, or a combination thereof. Other known communication methods which provide a medium for transmitting data between separate are also contemplated.

User device 140 is configured to receive data (e.g., image and/or video data) from camera 110 and/or computing device 120 via network 130. User device 140 is also configured to present images and/or videos to the user. User device 140 is any type of computing device. For example, user device 140 is a smart phone, a tablet, a personal computer, a wearable device (e.g., Google Glass™ or smart watches, and/or affiliated components), or the like, or a combination thereof. In some embodiments, user device 140 and computing device 120 together are included in a computing device configured to perform exemplary functions of user device 140 and computing device 120 disclosed in this application.

User device 140 includes, among other things, a processor 141, a memory 142, a communication port, an input 144, and a display 145. Processor 141 executes computer instructions (program code) and performs functions of user device 140 in accordance with techniques described herein. For example, processor 141 is configured to receive image and/or video data from computing device 120 and/or camera 110 via network 130. Processor 141 also controls display 145 to present videos and/or images. Processor 141 includes or is part of one or more known processing devices such as, for example, a microprocessor. In some embodiments, processor 141 includes any type of single or multi-core processor, mobile device microcontroller, central processing unit, etc.

Memory 142 is configured to store one or more computer programs for execution by processor 141 to perform exemplary functions of user device 140 disclosed in this application. For example, in some embodiments, memory 142 is configured to store program(s) for execution by processor 141 to control display 145 to present videos and/or images. Memory 142 is also configured to store data and/or parameters used by processor 141 in methods described in this disclosure. Memory 142 is a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 143 is configured to transmit data to and receive data from, among other devices, camera 110 and user device 140 over network 130. Input 144 is configured to receive inputs from the user and transmit the data/signal relating to the received inputs to processor 141 for further processing. Display 145 is any device configured to display, among other things, videos and/or images in the UI based on the display data fed by processor 141.

Figure 2:
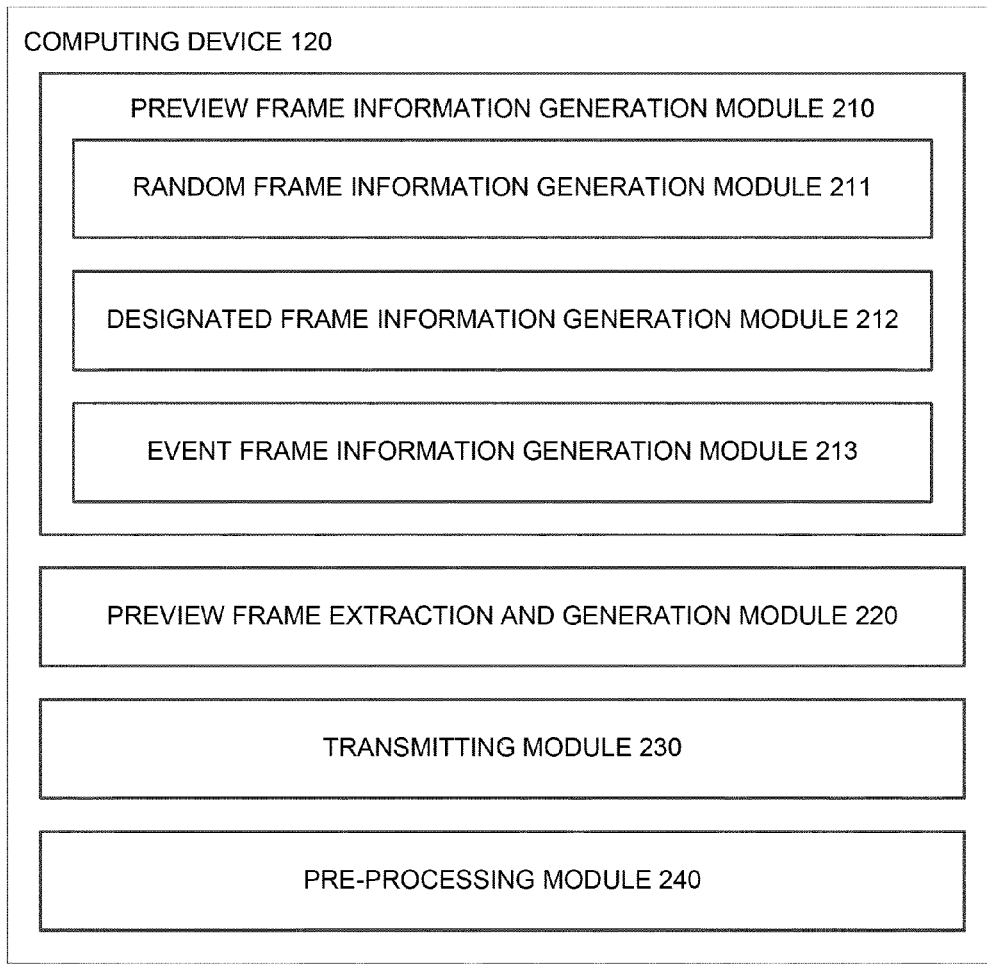
FIG. 2 is a block diagram of an exemplary device for generating a preview video for a video according to some embodiments.

Referring FIG. 2, computing device 120 includes a Preview Frame Information Generation Module 210, a Preview Frame Extraction and Generation Module 220, a Transmitting Module 230, and a Pre-Processing Module 240.

Generally, the word "module," as used herein, refers to logic embodied in hardware or firmware, or to a collection of software instructions. The modules described herein are implemented as software and/or hardware modules and are stored in any type of non-transitory computer-readable medium or other storage device. In some embodiments, a software module can be compiled and linked into an executable program. It will be appreciated that software modules can be callable from other modules or from themselves, and/or can be invoked in response to detected events or interrupts. Software modules configured for execution on computing devices (e.g., processor 121) can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

Preview Frame Information Generation Module 210 is configured to process the first version of the video received from camera 110 and obtain information of the video frames to be extracted from the second version of the video received from camera 110. For example, Preview Frame Information Generation Module 210 analyzes the first version of the video received from camera 110 and detects an event (e.g., a moving object included in the video) based on the analysis of the first version of the video. Preview Frame Information Generation Module 210 also determines a video frame of the first version of the video representing the detected event (e.g., a video frame including the detected moving object) and obtains information relating to the identified video frame (e.g., a time stamp of the video frame). Preview Frame Information Generation Module 210 saves the obtained information in memory 122. Alternatively or additionally, Preview Frame Information Generation Module 210 may transmit the information of the video frame of the first version of the video to Preview Frame Extraction and Generation Module 220 for extracting the corresponding video frame in the second version of the video as described below.

In some embodiments, Preview Frame Information Generation Module 210 includes three sub-modules: a Random Frame Information Generation Module 211, a Designated Frame Information Generation Module 212, and an Event Frame Information Generation Module 213. Each of these sub-modules may use a different mode for identifying one or more video frames from the first version of the video and/or obtaining the information relating to identified video frame(s). In some embodiments, each time only one of sub-modules 211-213 is invoked to identify one or more video frames and/or obtain information thereof, depending on which mode computing device 120 determines to use.

Random Frame Information Generation Module 211 is configured to identify one or more video frames for every certain period time of the video. Merely by way of example, Random Frame Information Generation Module 211 identifies a video frame for every minute of the first version of the video. Random Frame Information Generation Module 211 also obtains information relating to the identified video frame(s) (e.g., the time stamp(s) associated with the video frame(s)). Alternatively or additionally, Random Frame Information Generation Module 211 may randomly identify a predetermined number of video frames from the first version of the video and obtain the information thereof (e.g., the time stamps associated with the video frames). The obtained information is saved to memory 122 and/or sent to Preview Frame Extraction and Generation Module 220 for further processing, such processing being as described elsewhere in this disclosure.

Designated Frame Information Generation Module 212 is configured to identify one or more video frames from the video according to the identification information received from camera 110. Merely by way of example, a user identifies a particular time point (or time period) or a portion of the video in which the user is interested. In another example, camera 110 includes one or more motion sensors (not shown) configured to detect a moving object. When detecting an object, camera 110 records the time or time period corresponding to the detected object. The time information (transmitted by the user or camera 110 in the above examples) is then transmitted to computing device 120. Designated Frame Information Generation Module 212 then identifies one or more video frames from the first version of the video based on the time information received. Designated Frame Information Generation Module 212 further transmits the information of the identified video frame(s) to Preview Frame Extraction and Generation Module 220 for extracting the corresponding video frame(s) of the second version of the video. Alternatively, Preview Frame Extraction and Generation Module 220 receives the time information and extracts one or more video frames from the second version of the video based on the time information received.

Event Frame Information Generation Module 213 is configured to analyze the first version of the video and identify one or more events in the first version of the video based on the analysis of the first version of the video. In some embodiments, Event Frame Information Generation Module 213 also identifies one or more video frames from the first version of the video corresponding to the identified event(s). Event Frame Information Generation Module 213 obtains the information relating to the identified video frame(s) (e.g., the time stamp(s) and/or time period associated with the identified video frame(s)) and transmits the information to Preview Frame Extraction and Generation Module 220 for further processing as described elsewhere in this disclosure. In other embodiments, Event Frame Information Generation Module 213 obtains information relating to the identified event(s) (e.g., the time stamp(s) and/or time period associated with the identified event(s)) and transmits the information to Preview Frame Extraction and Generation Module 220 for further processing. For example, in some embodiments, Event Frame Information Generation Module 213 extracts a plurality of video frames from the first version of the video and analyzes the extracted video frames to identify an object included in the video frames. Event Frame Information Generation Module 213 also detects one or more events based on the analysis of the extracted video frames. Exemplary events include a motion event (e.g., a moving object is detected), object recognition (e.g., a criminal suspect is recognized), emergence event (e.g., a fire incidence is detected), etc. For example, Event Frame Information Generation Module 213 may detect a motion event included in the video by determining a difference in pixel values of a video frame and those of a preceding video frame. If the difference exceeds a threshold, a motion event is identified. Event Frame Information Generation Module 213 may further extract, from the first version of the video, one or more video frames associated with the identified event(s). Alternatively or additionally, Event Frame Information Generation Module 213 also obtains information associated with the extracted video frames associated with the identified event(s) (e.g., the time stamp(s) and/or time period associated with the video frames) and/or information associated with the identified event(s) (e.g., the time stamp(s) and/or time period associated with the identified event(s)). The information is further transmitted to Preview Frame Extraction and Generation Module 220 for further processing.

Preview Frame Extraction and Generation Module 220 is configured to receive, from camera 110 (or computing device 120), a second version of the video, which has a different resolution than that of the first version of the video. Merely by way of example, the first version of the video has a resolution of 426×240, and the second version of the video has a higher resolution of 3840×2160. In some embodiments, Preview Frame Extraction and Generation Module 220 extracts one or more video frames from the second version of the video according to the information of the identified video frames of the first version transmitted from Preview Frame Information Generation Module 210. For example, Designated Frame Information Generation Module 212 (i.e., a part of Preview Frame Information Generation Module 210) identifies one or more video frames from the first version of the video based on the information transmitted by camera 110 (e.g., a time stamp or time period associated with a special event identified by the user when taking the video), as described above. Preview Frame Extraction and Generation Module 220 then extracts from the second version of the video the corresponding video frame(s) based on the identified video frame(s) of the first version of the video as the preview frames for the video.

Alternatively or additionally, Preview Frame Extraction and Generation Module 220 extracts one or more video frames according to the information relating to the identified event(s) transmitted from camera 110 and/or Preview Frame Information Generation Module 210. For example, Event Frame Information Generation Module 213 (i.e., part of Preview Frame Information Generation Module 210) detects one or more events (e.g., a moving object included in the video) in the first version of the video and obtains information relating to the detected event(s) (e.g., one or more time stamps associated with the event(s)). Event Frame Information Generation Module 213 transmits the obtained information to Preview Frame Extraction and Generation Module 220. Preview Frame Extraction and Generation Module 220 then extracts from the second version of the video one or more video frames as the preview frames for the video. Preview Frame Extraction and Generation Module 220 further generates one or more preview videos (or motion picture) including the extracted video frames from the second version of the video.

In some embodiments, the preview frame(s) and/or the preview video(s) are saved to memory 122 and/or a network storage (not shown). In some embodiments, Transmitting Module 230 transmits the extracted preview frame(s) and/or generated preview video(s) to user device 140. Alternatively or additionally, Transmitting Module 230 generates a link to the network device (not shown) storing the preview frame(s) and/or the preview video(s), which is then transmitted to user device 140. The user can then access the preview frame(s) and video(s) by clicking the link from user device 140.

In some embodiments, Pre-Processing Module 240 pre-processes the video (or different versions thereof) before the video (or different versions thereof) is analyzed. For example, Pre-Processing Module 240 reduces noise from the video before the video is analyzed for identifying one or more events in the video. In some embodiments, one or more video frames and/or audio signal are extracted from the video (or different versions thereof), and Pre-Processing Module 240 reduces noise from the extracted video frame(s)

and/or audio signal(s) before the video frame(s) and/or audio signal(s) are analyzed for identifying one or events included in the video.

Figure 3:
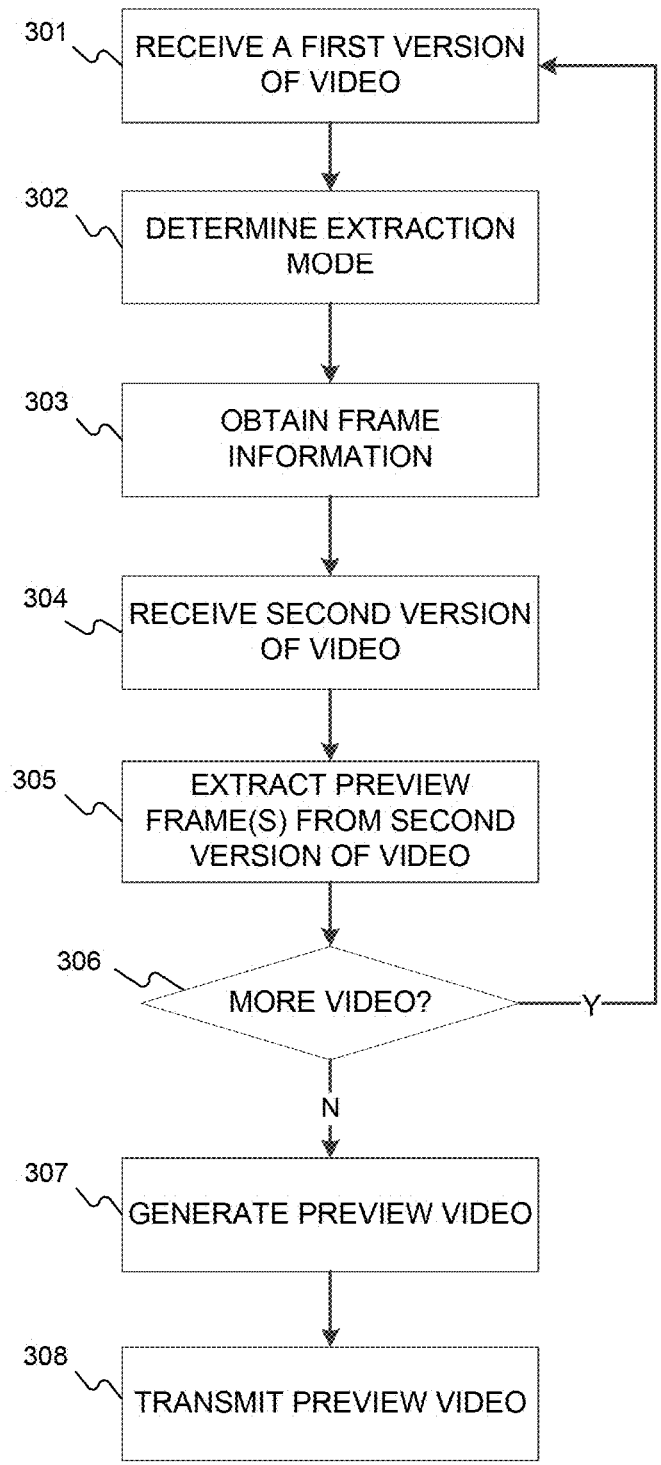
FIG. 3 is a flowchart of an exemplary process for generating a preview video for a video according to some embodiments.

FIG. 3 is a flowchart of an exemplary process 300 for generating a preview video for a video. At 301, processor 121 of computing device 120 receives a first version of the video. The video is captured by camera 110 in a native resolution, which is converted into a version with a different resolution. For example, camera 110 captures a video at a resolution of 3840×2160 and converts the video into a version of the video with a lower resolution (e.g., 426×240). Camera 110 then transmits a first version of the video (i.e., the version with the lower resolution of 426×240) and a second version of the video (i.e., the version with the higher resolution of 3840×2160) to computing device 120 for further processing. Alternatively, camera 110 transfers a video to computing device 120, which then converts the video with the higher resolution (i.e., the second version of the video) into a version of the video with a lower resolution (i.e., the first version of the video). In some embodiments, processor 121 optionally pre-processes the received video(s) (or different versions thereof). For example, processor 121 optionally reduces noise from the video(s).

In other embodiments, computing device 120 receives the video from camera 110 and converts the video into a version with a lower resolution (i.e., the first version of the video) and another version with a resolution that is higher than that of the first version of the video (i.e., the second version of the video). For example, camera 110 captures a video at 3840×2160, which is transmitted to computing device 120. Computing device 120 then converts the video into two versions: the first version having a resolution of 426×240 and the second version having a resolution of 1920×1080.

At 302, processor 121 determines a mode for identifying one or more video frames from the first version of the video. The exemplary modes may include random frame mode, designated frame mode, and event frame mode, which is performed by Random Frame Information Generation Module 211, Designated Frame Information Generation Module 212, and Event Frame Information Generation Module 213, respectively. The determination of which mode to be used for identifying the video frames may be based on the user's preference. Alternatively or additionally, the determination may be based on certain information received from camera 110 and/or user device 140. Merely by way of example, the user can label a time stamp or time period associated with a portion of the video when camera 110 captures the video. Such time information is transmitted to computing device 120 from camera 110 (or from user device 140 if the user logs the time information on user device 140). Computing device 120 then determines that the designated frame mode is selected based on the time information received. Designated Frame Information Generation Module 212 is then invoked to identify one or more video frames from the first version of the video. Alternatively, Preview Frame Extraction and Generation Module 220 extracts, from the second version of the video, one or more video frames as preview frames based on the time information received.

In some embodiments, once the mode for identifying video frames is determined, processor 121, at 303, identifies one or more video frames and obtains information thereof based on the parameter and/or settings of the mode determined. For example, if the random frame mode is selected, Random Frame Information Generation Module 211 is invoked to identify a video frame for every certain period for every certain period time of the first version of the video. Merely by way of example, Random Frame Information Generation Module 211 identifies a video frame for every minute of the video. In another example, Random Frame Information Generation Module 211 randomly selects a predetermined number of video frames for the entire video or a portion thereof. For example, the video may last an hour, and 60 video frames are randomly selected from the video. Random Frame Information Generation Module 211 also obtains information relating to the identified video frame(s). For example, the time stamp(s) of the video frame(s) appearing in the video is obtained.

At 304, processor 121 receives a second version of the video, which is transmitted from camera 110 or converted by computing device 120 based on the original video captured by camera 110 as described elsewhere in this disclosure. At 305, processor 121 extracts preview frame(s) from the second version of the video according to the information relating to the identified video frame(s). For example, at 303, one or more video frames are identified in the event frame mode as being associated with an identified event included in the first version of the video (e.g., an identified moving object appearing in the video). The time stamp(s) of the video frame(s) appearing in the first version of the video is obtained. Processor 121 extracts, from the second version of the video, the video frame(s) having the same (or similar) time stamp(s) appearing in the second version of the video as the preview frame(s). The extracted preview frame(s) is saved to memory 122 and/or a cloud storage (not shown).

At 306, processor 121 determines whether there is a new video available for analyze. If so, processor 121 returns to 301 and proceeds through 305 (if applicable) as described above. If not, processor 121, at 307, generates a preview video (or a motion picture) for the video(s) analyzed. The preview video (or a motion picture) includes some or all extracted preview frames (or a lower resolution version thereof). In some embodiments, the preview video also includes the information relating to the event(s) detected in the preview frames, including, for example, time stamp(s) of the event(s) and/or type(s) of the event(s). The preview video has a predetermined frame rate. For example, the frame rate of the preview video may be within a range of 1 frame per second (fps) to 60 fps. In other embodiments, the frame rate of the preview video may be restricted in a subrange of 1-5 fps, 6-10 fps, 10-30 fps, or 31-60 fps.

In some embodiments, at 308, processor 121 transmits the preview video and/or preview frames to user device 140. Alternatively or additionally, a link to the storage device storing the preview frame(s) and/or the preview video(s) is generated and transmitted to user device 140. The user can then access the preview frame(s) and/or preview video(s) by clicking the link from user device 140.

Figure 4:
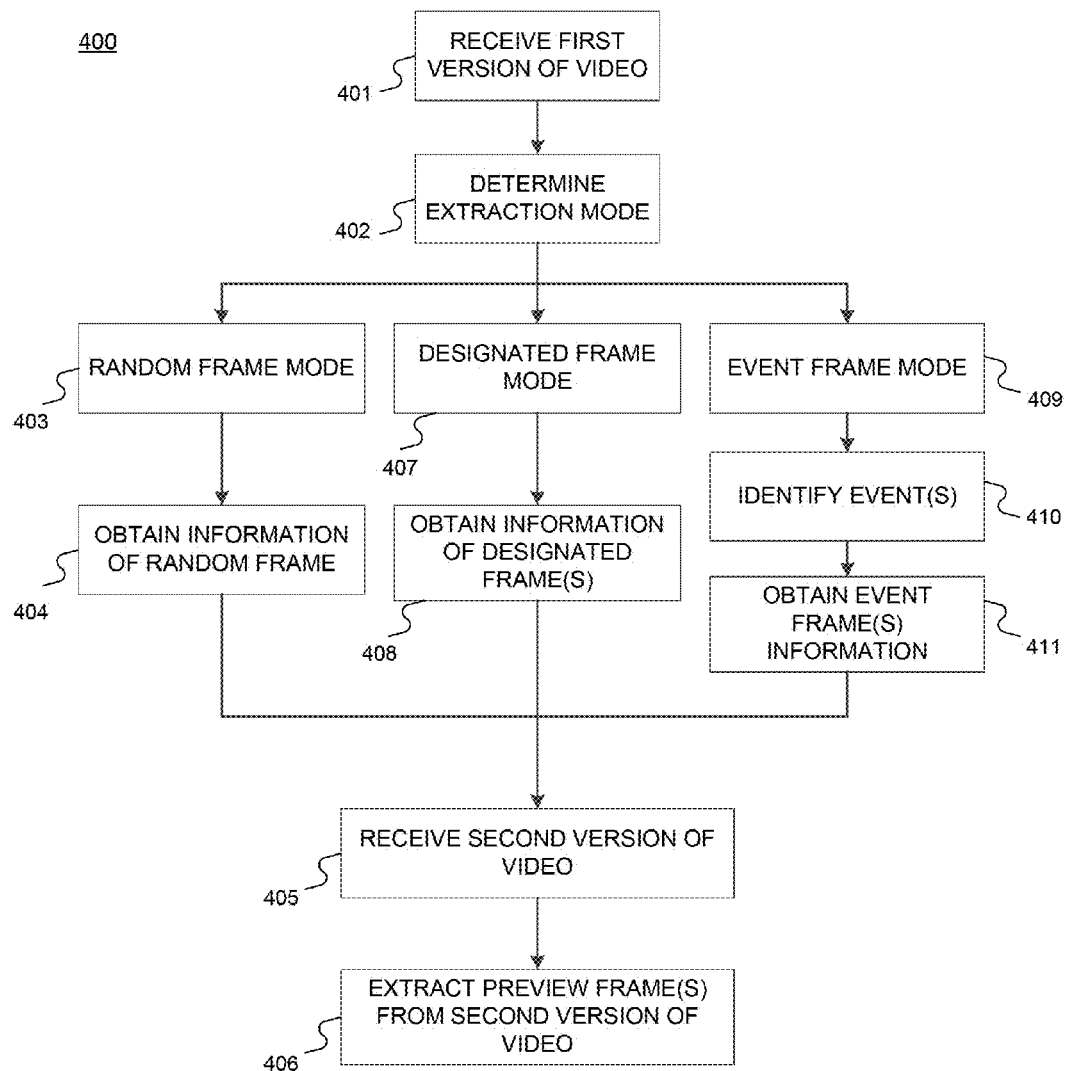
FIG. 4 is a flowchart of an exemplary process for generating video preview frames according to some embodiments.

Referring to steps 301 to 305, in some embodiments, one or more preview frames can be extracted from the second version of the video based on an exemplary process 400 shown in FIG. 4. As illustrated in FIG. 4, at 401, processor 121 receives the first version of the video and, at 402, determines a mode for identifying one or more video frames from the first version of the video, as described elsewhere in this disclosure. At 403, if the random frame mode is selected, Random Frame Information Generation Module 211 is invoked to identify a video frame for every certain period for every certain period time of the first version of the video. For example, Random Frame Information Generation Module 211 identifies a video frame for every minute of the first version of the video. Alternatively, Random Frame Information Generation Module 211 randomly selects a predetermined number of video frames for the entire video or a portion thereof. At 404, Random Frame Information Generation Module 211 also obtains information relating to the identified video frame(s). For example, the time stamp(s) of the video frame(s) appearing in the video are obtained.

In some embodiments, Random Frame Information Generation Module 211 determines a time point for every certain period for every certain period time, without identifying a video frame of the first version of the video. Alternatively, Random Frame Information Generation Module 211 determines a predetermined number of time points for the whole video, without identifying a video frame of the first version of the video. The time information is then transmitted to Preview Frame Extraction and Generation Module 220 for extracting preview frame(s), as described elsewhere in this disclosure.

Processor 121, at 405, receives a second version of the video and, at 406, extracts one or more preview frames from the second version of the video, as described elsewhere in this disclosure.

Referring back to 402, in some embodiments, if the designated frame mode is selected at 407, Designated Frame Information Generation Module 212 is invoked to identify one or more video frames from the first version of the video. For example, a user identifies a particular time point or time period in the video from user device 140 or camera 110. In another example, camera 110 includes one or more sensors (not shown) configured to detect a moving object. When detecting an object, camera 110 records the time or time period for the detected object. Camera 110 (or user device 140) transmits the time information to computing device 120. Designated Frame Information Generation Module 212 then identifies one or more video frames from the first version of the video based on the time information received. At 408, Designated Frame Information Generation Module 212 further transmits the information of the identified video frame(s) to Preview Frame Extraction and Generation Module 220 for extracting the corresponding video frame(s) of the second version of the video. Alternatively, Preview Frame Extraction and Generation Module 220 receives the information from camera 110 (or user device 140) and extracts one or more video frames from the second version of the video based on the time information received. Processor 121 then, at 405, receives a second version of the video and, at 406, extracts one or more preview frames from the second version of the video, as described elsewhere in this disclosure.

Referring again to 402, in some embodiments, if the event frame mode is selected at 409, Event Frame Information Generation Module 213 is invoked, at 410, to analyze the first version of the video and detect an event (e.g., a moving object included in the video) based on the analysis of the first version of the video. Event Frame Information Generation Module 213 also determines one or more video frames associated with the detected event (e.g., a video frame including the detected moving object). Event Frame Information Generation Module 213 further, at 411, obtains information relating to the identified video frame(s) (e.g., the time stamp(s) of the video frame(s) appearing in the video). Preview Frame Extraction and Generation Module 220 then, at 405, receives a second version of the video and, at 406, extracts one or more preview frames from the second version of the video, as described elsewhere in this disclosure.

Figure 5:
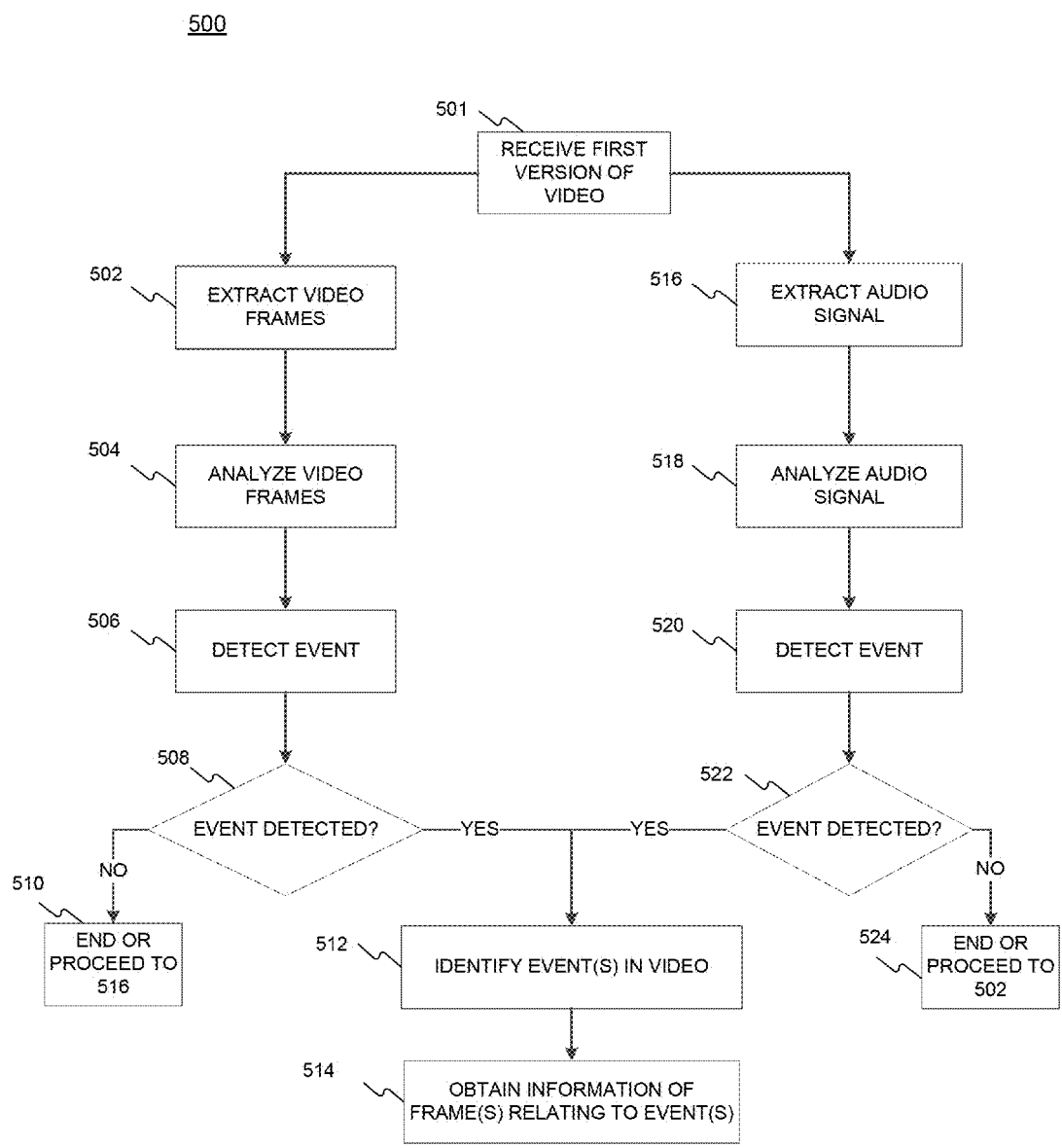
FIG. 5 is a flowchart of an exemplary process for obtaining information relating to one or more events according to some embodiments.

In some embodiments, steps 409 through 411 (in the event frame mode) are performed based on an exemplary process 500 shown in FIG. 5. As illustrated in FIG. 5, at 501, processor 121 receives the first version of the video, as described elsewhere in this disclosure. In some embodiments, processor 121 optionally pre-processes the received video(s) (or different versions thereof). Event Frame Information Generation Module 213 may detect one or more events based on video frames extracted from the first version of the video. For example, in case of such detection, at 502, Event Frame Information Generation Module 213 extracts a plurality of video frames from the first version of the video. In some embodiments, Event Frame Information Generation Module 213 extracts the video frames from the first version of the video continuously. Alternatively, one video frame is extracted within a period of time. Merely by way of example, Event Frame Information Generation Module 213 may extract one video frame from every second or every minute of the first version of the video. In some embodiments, the rate of extracting video frames is adjustable. For example, initially one video frame is extracted for every minute of the video. An event may be detected at some time point of the video (e.g., a moving object is detected). From that detection time point on (and/or a certain period of time before the time point), the rate of extracting video frames increases to, for example, 30 frames per minute from the previous rate of one frame per minute. The rate decreases if no more events are detected subsequently within a period of time. For example, the rate decreases back to one frame per minute if the moving object previously detected is not included in the video for, for example, 10 minutes.

Event Frame Information Generation Module 213 analyzes the extracted video frames at 504. For example, Event Frame Information Generation Module 213 analyzes the video frames to identify an object included in the images. An exemplary process for analyzing video frames is described in detail below in connection with FIG. 6. Event Frame Information Generation Module 213, at 506, may detect one or more events based on the analysis of the video frames. Exemplary events may include a motion event (e.g., a moving object is detected), object recognition (e.g., a criminal suspect is recognized), moment recognition (e.g., a surfer reaches the highest point), emergence event (e.g., a fire incidence is detected), etc. For example, Event Frame Information Generation Module 213 detects a motion event included in a video by determining a difference in pixel values of a video frame and those of a preceding video frame. If the difference exceeds a threshold, a motion event is identified.

At 508, Event Frame Information Generation Module 213 determines whether any event is detected. If no event is detected (508—NO), at 510, process 500 either ends or, alternatively, proceeds to 516, and an event can be detected based on analysis of the audio signal of the video (steps 516 through 522), as described below. Additionally or alternatively, if no event is detected, the random frame mode (e.g., steps 403-404 illustrated in FIG. 4) and/or designated frame mode (e.g., steps 407-408 illustrated in FIG. 4) can be invoked for identifying one or more preview frames, as described elsewhere in this disclosure.

On the other hand, if one or more events are detected (508—YES), at 512, Event Frame Information Generation Module 213 identifies the event(s) in the video based on the extracted video frames. Event Frame Information Generation Module 213 also identifies one or more video frames associated with the identified event. At 514, Event Frame Information Generation Module 213 obtains information relating to the identified event(s) and/or information relating to the identified video frame(s) associated with the event(s). For example, Event Frame Information Generation Module 213 obtains a time stamp (e.g., the starting time of the event) and/or a time window (e.g., the starting time and ending time of the event) for the detected event. Event Frame Information Generation Module 213 may also obtain starting and ending points of the event. In some embodiments, Event Frame Information Generation Module 213 further identifies the video frames associated with the detected event (e.g., the video frames during the event, and within a period of time before and/or after the event). The obtained information is transmitted to Preview Frame Extraction and Generation Module 220 for extracting one or more preview frames from the second version of the video, as described elsewhere in this disclosure.

In some embodiments, Event Frame Information Generation Module 213 identifies one or more events based on an audio signal of the first version of the video, as an alternative or in addition to detecting one or more events based on video frames described above (i.e., steps 502 through 508). For example, at 516, Event Frame Information Generation Module 213 extracts an audio signal from the video. Event Frame Information Generation Module 213, at 518, analyzes the extracted audio signal. Merely by way of example, Event Frame Information Generation Module 213 determines whether there is any speech or any particular sound (e.g., laughter, crying, screaming, applause, glass shattering, etc.) included in the audio signal. An exemplary process for analyzing an audio will be described in detail below in connection with FIG. 7.

Event Frame Information Generation Module 213, at 520, detects one or more events based on the analysis of the audio signal. For example, Event Frame Information Generation Module 213 may detect a break-in event based on the detected sound of shattering glass (e.g., a window) in the audio signal. At 522, Event Frame Information Generation Module 213 determines whether there is any event detected. If no event is detected (522—OR), at 524, process 500 either ends, or alternatively, proceeds to 502, and an event can be detected based on analysis of video frames of the video (steps 502 through 508), as described above. Additionally or alternatively, if no event is detected, the random frame mode (e.g., steps 403-404 illustrated in FIG. 4) and/or designated frame mode (e.g., steps 407-408 illustrated in FIG. 4) can be invoked for identifying one or more preview frames, as described elsewhere in this disclosure.

On the other hand, if one or more events are detected (522—YES), Event Frame Information Generation Module 213, at 512, identifies the event(s) in the video based on the audio signal. Event Frame Information Generation Module 213 further identifies one or more video frames associated with the identified event(s). At 514, Event Frame Information Generation Module 213 also obtains information relating to the identified event(s) and/or information relating to the identified video frame(s) associated with the event(s), as described elsewhere in this disclosure.

In some embodiments, the identified video frame(s) based on the video frames and/or audio signal is treated as candidate frames. Event Frame Information Generation Module 213 determines a score for each of the candidate frames. For example, if a candidate frame includes a person of interest, the candidate frame receives a high score. In some embodiments, the user can adjust the parameters and/or settings for determining the score of candidate frames. For example, the user can set a high score for a candidate frame that includes a particular person (e.g., the user, a family member, a friend, a criminal suspect, etc.), object (e.g., a pet, an animal, a car, a bicycle, etc.), scene (e.g., sunset, sunrise, night scene, beach, etc.), and/or special moment (e.g., a particular action by a player during a game, etc.). If the score of a candidate frame exceeds a threshold, the information relating to this candidate frame is obtained (e.g., the time stamp associated with the candidate frame) and transmitted to Preview Frame Extraction and Generation Module 220. In other embodiments, information relating to a candidate frame that includes a particular person, object, scene, and/or special moment is then obtained (e.g., the time stamp associated with the candidate frame) and transmitted to Preview Frame Extraction and Generation Module 220. Preview Frame Extraction and Generation Module 220 then extracts from the second version of the video one or more video frames based on the information received, as described elsewhere in this disclosure.

In some embodiments, a detected event based on the analysis of video frames is cross-referenced with the audio signal of the video to confirm the detected event, and vice versa. For example, if an event has been identified based on video frames extracted from the video, Event Frame Information Generation Module 213 checks whether a similar event is also present in the audio signal around the same time. If so, Event Frame Information Generation Module 213 associates the two events together and treats them as one signal event.

Merely by way of example, Event Frame Information Generation Module 213 may detect a break-in event based on the video frames (at, for example, step 506). Event Frame Information Generation Module 213 then obtains a time stamp and/or time window associated with the event. Event Frame Information Generation Module 213 then determines whether a similar event is also detected in the audio signal around the time stamp and/or time window associated with the break-in event (e.g., within a period of 1 minute before the time stamp to 1 minute after the time stamp). If so, Event Frame Information Generation Module 213 treats the two events as a single event. Alternatively, Event Frame Information Generation Module 213 also analyzes the audio signal around the time stamp and/or time window associated with the break-in event (at, for example, step 518). A sound associated with the break-in event detected by Event Frame Information Generation Module 213 is used to confirm the event detected based on the analysis of the video frames. In another example, an event (e.g., a shattering sound) is detected based on the audio signal, and the time stamp and/or time window associated with the event is obtained. Event Frame Information Generation Module 213 then checks whether any event is detected based on the video frames around the same time. Alternatively or additionally, Event Frame Information Generation Module 213 extracts video frames around the time point at which the shattering sound is detected. Event Frame Information Generation Module 213 then analyzes the video frames and determines whether an event is detected around that time point. If an event is detected, Event Frame Information Generation Module 213 treats the two events as one event.

In some embodiments, Event Frame Information Generation Module 213 determines a score for cross-referencing two detected events around the same time that are detected separately by analyzing the video frames and the audio signal. If the determined score equals to or exceeds a threshold, Event Frame Information Generation Module 213 counts the events as a single event and may perform step 512 as described above. On the other hand, if the score is less than the threshold, Event Frame Information Generation Module 213 does not recognize them as an event. In doing so, a false event is prevented from being recorded. For example, if an event is detected based on the video frames and another event around the same time is also detected based on the audio signal, Event Frame Information Generation Module 213 may determine a score of 3 for two events (1.5 for each). The score exceeds a threshold of 2, and Event Frame Information Generation Module 213 identifies and counts the two events as one event. In another example, an event is detected based on the audio signal, but no event is detected based on the video frames around the same time, and Event Frame Information Generation Module 213 determines a score of 1.5. The score is lower than the threshold score of 2. As a result, Event Frame Information Generation Module 213 ignores this event detected based on the audio signal because the event detected based on the audio signal is caused by sound outside of the premises. In some embodiments, when determining the score, Event Frame Information Generation Module 213 gives a different weight to events detected based on the video frames than to those detected based on the audio signal. Alternatively or additionally, a score weight for an event is associated with a category and/or alert level of the special event detected.

Figure 6:
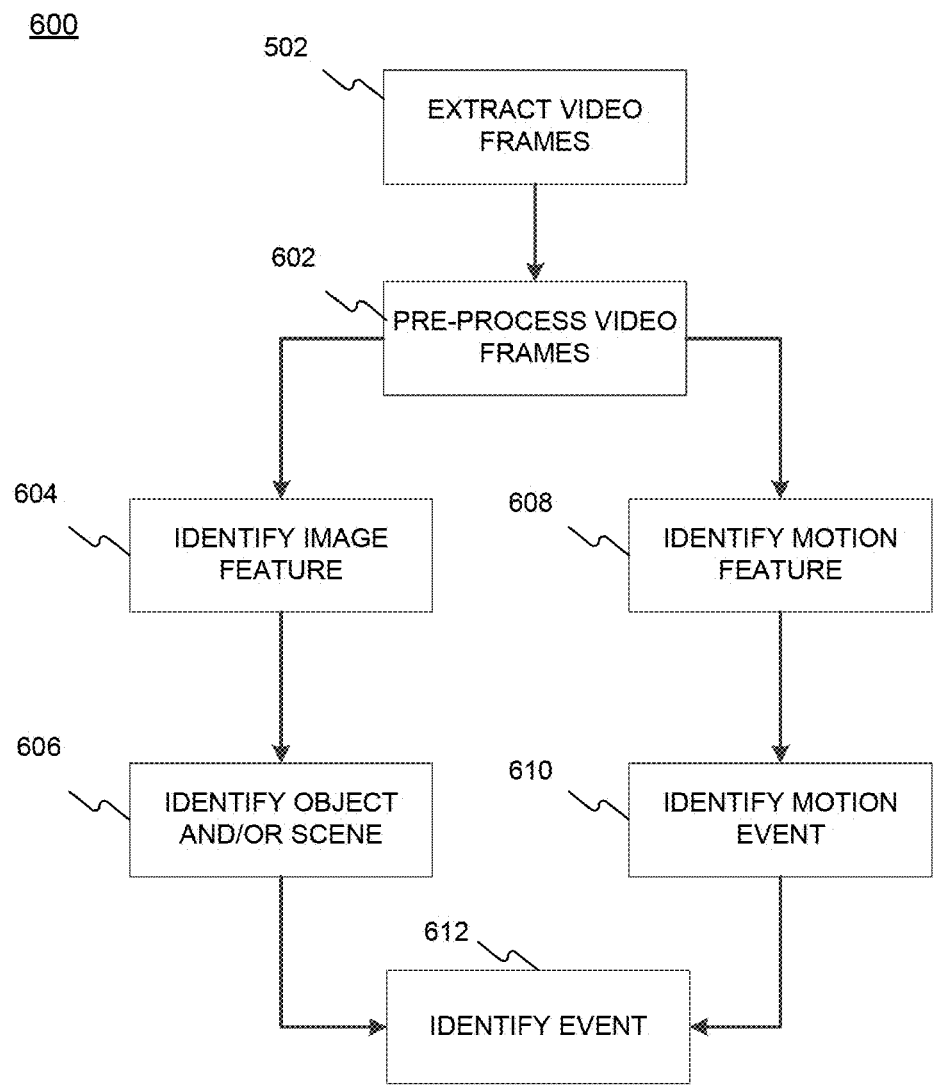
FIG. 6 is a flowchart of an exemplary process for identifying an event based on one or more video frames according to some embodiments.

Referring back to 502, in some embodiments, video frames extracted at 502 are analyzed at 504 for detecting one or more events based on an exemplary process 600 shown in FIG. 6. As illustrated in FIG. 6, at 602, Pre-Processing Module 240 pre-processes the extracted video frames obtained at step 502 before they are analyzed for identifying one or more events included in the video. For example, Pre-Processing Module 240 reduces noise from the extracted video frames. At 604, Event Frame Information Generation Module 213 identifies one or more image features included in the extracted video frames. Exemplary image feature(s) includes human bodies, human faces, pets, animals, cars, bicycles, scenes (e.g., sunset, sunrise, night scene, grassland, beach, etc.), things, special moments (e.g., an action by a player during a game, a surfer reaching to the highest point, etc.), etc. Algorithm(s) for detecting one or more objects, scenes, and/or moments in an image can be utilized to identify image features, including, for example, blob detection, edge detection, scale-invariant feature transformation, corner detection, shape detection, etc. Other algorithms for detecting an object from an image are also contemplated.

At 606, Event Frame Information Generation Module 213 identifies one or more objects (or a scene or a moment) included in the identified image feature(s) by, for example, comparing the identified image feature(s) with one or more object models (and/or scene models) previously constructed. In some embodiments, Event Frame Information Generation Module 213 determines a matching score between an identified image feature and an object included in an object model, based on image characteristics of the image feature and those of the object model. An object (or scene) model is generated by Event Frame Information Generation Module 213 based on one or more images of a known object (or scene). For example, Event Frame Information Generation Module 213 receives an image of the user's pet. Properties and/or characteristics of the portion image including the pet are extracted and saved as an object model associated with the user's pet. The object model may include other information. For example, the object model may include a type of the object (e.g., a human body, human face, thing, pet, etc.). Alternatively or additionally, the object model may include an alert level and/or category associated with the object of the object model. In some embodiments, an object and/or scene model is generated by a third party, and Event Frame Information Generation Module 213 accesses the object model. For example, the object model associated with a wanted criminal suspect is downloaded from a police website and saved in memory 122 for future use. In some embodiments, Event Frame Information Generation Module 213 also determines a type of the identified image feature(s). Event Frame Information Generation Module 213 further identifies the object(s) included in the image feature(s). For example, Event Frame Information Generation Module 213 may determine that the detected image feature is a man's face by comparing the image feature and one or more object models. Event Frame Information Generation Module 213 may also determine the face detected in the video frame is the face of a wanted man.

Alternatively or additionally, referring to 608, Event Frame Information Generation Module 213 identifies one or more motion features included in a video frame and its preceding (or subsequent) video frame. A motion feature can be an area of sequential video frames in which the pixel values change from a video frame to a preceding (or subsequent) video frame caused by a moving object. In some embodiments, Event Frame Information Generation Module 213 may determine a difference between a video frame and its preceding (or subsequent) video frame by, for example, comparing pixel values of the video frame and the preceding (or subsequent) video frame. If the difference is equal to or exceeds a threshold, Event Frame Information Generation Module 213 identifies the area as a motion feature.

At 610, Event Frame Information Generation Module 213 identifies one or more motion events based on the identified motion feature(s). In some embodiments, Event Frame Information Generation Module 213 can access one or more motion models previously constructed and stored in memory 122. Event Frame Information Generation Module 213 identifies one or more motion events by, for example, comparing the identified motion feature(s) with the motion model(s). For example, Event Frame Information Generation Module 213 identifies the moving object(s) as a moving pet or human being by, for example, comparing the motion feature(s) detected with the motion feature included in a motion model.

A motion model used for identifying motion features can be generated by Event Frame Information Generation Module 213 based on a known motion feature previously identified. For example, Event Frame Information Generation Module 213 previously identifies a motion feature caused by the user's pet. Properties and/or characteristics of the sequential video frames are extracted and analyzed. A motion model can be created based on the properties and/or characteristics of the sequential image frames for the moving pet. A motion model may have other information. For example, a motion model may include a type of the moving object (e.g., a human body, human face, thing, pet, etc.). Alternatively or additionally, a motion model may include an alert level and/or category associated with the moving object of the motion model. In some embodiments, a motion model is generated by a third party, and Event Frame Information Generation Module 213 can access the motion model.

At 612, Event Frame Information Generation Module 213 detects one or more events based on the object(s) and scene identified at 606, and/or the moving object(s) identified at 610. Process 500 (as illustrated in FIG. 5) proceeds at 508, as described elsewhere in this disclosure.

Figure 7:
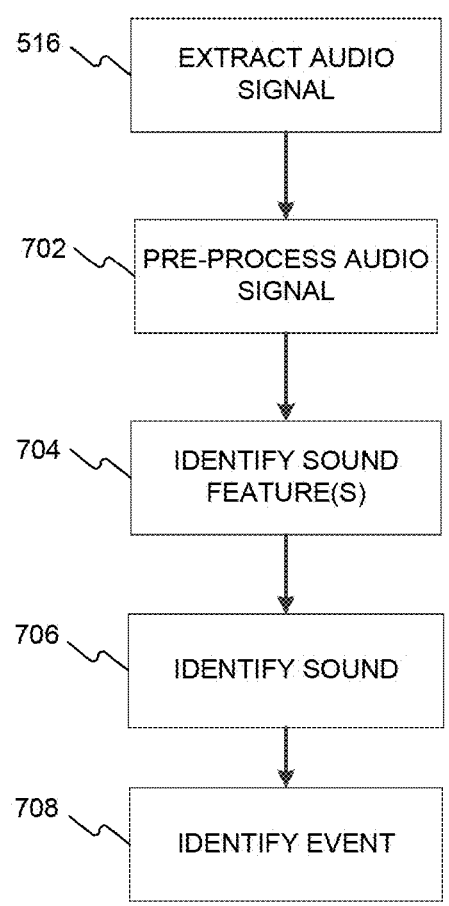
FIG. 7 is a flowchart of an exemplary process for identifying an event based on a sound signal of a video according to some embodiments.

Referring again to FIG. 5, in some embodiments, the audio signal extracted at step 516 is analyzed for detecting one or more events based on an exemplary process 700 shown in FIG. 7. As illustrated in FIG. 7, at 702, Pre-Processing Module 240 pre-processes the extracted audio signal obtained at step 516. For example, Pre-Processing Module 240 reduces noise from the extracted audio signal before it is analyzed for identifying one or more events included in the video. At 704, Event Frame Information Generation Module 213 identifies one or more sound features included in the exacted audio signal. In some embodiments, a sound feature is a sound causing a change of ambient sound level (dB) or a sound that is different from ambient sound (e.g., sound caused by a pet). For example, Event Frame Information Generation Module 213 determines a change in sound level of the audio signal. If the change is equal to or greater than a threshold, Event Frame Information Generation Module 213 identifies the change as a sound feature.

At 706, Event Frame Information Generation Module 213 identifies the sound (e.g., speaking speech, sound of glass shattering, laughter, crying, scream, applause, sound caused by an animal, etc.) by, for example, comparing the sound feature(s) with one or more sound models. In some embodiments, Event Frame Information Generation Module 213 determines a matching score between acoustic characteristics of a sound feature and those of a sound model.

A sound model is generated by Event Frame Information Generation Module 213 based a known sound (e.g., speaking, speech, sound of glass shattering, laughter, crying, scream, applause, sound caused by an animal, etc.). For example, acoustic characteristics of a known person's voice are extracted and saved as a sound model associated with the person. A sound model may include other information. For example, a sound model may include a type of the sound (e.g., speaking, speech, sound of glass shattering, laughter, crying, scream, applause, sound caused by an animal, etc.). Additionally, a sound model may include an alert level and/or category associated with the sound model. In some embodiments, a sound model may be generated by a third party, and Event Frame Information Generation Module 213 may access the object model.

Event Frame Information Generation Module 213, at 708, detects one or more events based on the sound identified. Process 500 (as illustrated in FIG. 5) proceeds at 522, as described elsewhere in this disclosure.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A device for generating one or more preview frames for a video, the device comprising:
    a memory that stores instructions; and
    one or more processors configured to execute the instructions to:
        receive a first version of the video, the first version of the video having a first resolution;
        analyze the first version of the video;
        identify a first preview frame from the first version of the video based on the analysis of the first version of the video;
        obtain information relating to the identified first preview frame;
        receive a second version of the video, the second version of the video having a second resolution, the second resolution being greater than the first resolution; and
        extract, from the second version of the video, a second preview frame according to the information relating to the first preview frame.

2. The device of claim 1, wherein the one or more processors are further configured to transmit the first preview frame or the second preview frame to a user.

3. The device of claim 1, wherein the identifying the first preview frame from the first version of the video includes:
    receiving, from a user, information relating to a time point in the video; and
    identifying a preview frame from the first version of the video according to the information relating to the time point in the video as the first preview frame.

4. The device of claim 1, wherein identifying the first preview frame comprises randomly selecting the first preview frame from a portion of the first version of the video.

5. The device of claim 1, wherein the one or more processors are further configured to:
    detect an event from the first version of the video based on the analysis of the first version of the video, the event including at least one of an object, a moving object, or a sound detected in the first version of the video; and
    identify an event preview frame corresponding to the detected event.

6. The device of claim 5, wherein the one or more processors are further configured to:
    extract one or more video frames from the first version of the video;
    detect an object from the extracted one or more video frames; and
    detect the event corresponding to the detected object.

7. The device of claim 5, wherein the one or more processors are further configured to:
    extract an audio signal from the video;
    detect a sound included in the audio signal; and
    detect the event from the first version of the video corresponding to the detected sound.

8. The device of claim 1, wherein the one or more processors are further configured to:
    identify a first plurality of preview frames from the first version of the video, the first plurality of preview frames including the first preview frame;
    obtain information relating to the first plurality of preview frames; and
    extract, from the second version of the video, a second plurality of preview frames according to the information relating to the first plurality of preview frames, the second plurality of preview frames including the second preview frame.

9. The device of claim 8, wherein the one or more processors are further configured to generate a preview video including the extracted second plurality of preview frames.

10. The device of claim 9, wherein the one or more processors are further configured to transmit the generated preview video to a user.

11. A method for generating one or more preview frames for a video, the method comprising:
    receiving a first version of the video, the first version of the video having a first resolution;

analyzing the first version of the video;

identifying a first preview frame from the first version of the video based on the analysis of the first version of the video;

obtaining information relating to the identified first preview frame;

receiving a second version of the video, the second version of the video having a second resolution, the second resolution being greater than the first resolution; and extracting, from the second version of the video, a second preview frame according to the information relating to the first preview frame.

12. The method of claim 11, further comprising transmitting the first preview frame or the second preview frame to a user.

13. The method of claim 11, wherein the identifying the first preview frame from the first version of the video includes:

receiving, from a user, information relating to a time point in the video; and identifying a preview frame from the first version of the video according to the information relating to the time point in the video as the first preview frame.

14. The method of claim 11, wherein identifying the first preview frame comprises randomly selecting the first preview frame from a portion of the first version of the video.

15. The method of claim 11, further comprising:

detecting an event from the first version of the video based on the analysis of the first version of the video, the event including at least one of an object, a moving object, or a sound detected in the first version of the video; and identifying an event preview frame corresponding to the detected event.

16. The method of claim 15, further comprising:

extracting one or more video frames from the first version of the video;

detecting an object from the extracted one or more video frames; and detecting the event corresponding to the detected object.

17. The method of claim 11, further comprising:

identifying a first plurality of preview frames from the first version of the video, the first plurality of preview frames including the first preview frame;

obtaining information relating to the first plurality of preview frames; and extracting, from the second version of the video, a second plurality of preview frames according to the information relating to the first plurality of preview frames, the second plurality of preview frames including the second preview frame.

18. The method of claim 17, further comprising generating a preview video including the extracted second plurality of preview frames.

19. The method of claim 18, further comprising transmitting the generated preview video to a user.

20. A non-transitory computer readable medium embodying a computer program product, the computer program product comprising instructions configured to cause a computing device to:

receive a first version of the video, the first version of the video having a first resolution;

analyze the first version of the video;

identify a first video frame from the first version of the video based on the analysis of the first version of the video;

obtain information relating to the identified first preview frame;

receive a second version of the video, the second version of the video having a second resolution, the second resolution being greater than the first resolution; and extract, from the second version of the video, a second preview frame according to the information relating to the first preview frame.

* * * * *